(12) United States Patent
Galipeau et al.

(10) Patent No.: US 8,203,437 B2
(45) Date of Patent: Jun. 19, 2012

(54) PROGRAMMABLE DISPLAY SWITCH

(76) Inventors: Steven R. Galipeau, Redmond, WA (US); Rory G. Briski, Bellevue, WA (US)

( * ) Notice: Subject to any disclaimer, the term of this patent is extended or adjusted under 35 U.S.C. 154(b) by 1147 days.

(21) Appl. No.: 11/974,087

(22) Filed: Oct. 11, 2007

(65) Prior Publication Data

US 2009/0095606 A1    Apr. 16, 2009

Related U.S. Application Data

(60) Provisional application No. 60/851,231, filed on Oct. 12, 2006.

(51) Int. Cl.
  *H04Q 3/00* (2006.01)
  *G08B 17/06* (2006.01)
  *G08B 21/00* (2006.01)
  *G04B 23/02* (2006.01)
  *H03K 23/66* (2006.01)
(52) U.S. Cl. ............ 340/14.69; 340/5.62; 340/593; 340/644; 340/815.47; 385/17; 368/187; 368/224; 377/110

(58) Field of Classification Search ............... 700/1, 15, 700/17–18; 385/17; 340/5.62, 14.69, 593, 340/644, 815.47; 368/187, 224; 377/110
See application file for complete search history.

(56) References Cited

U.S. PATENT DOCUMENTS

| 4,792,032 | A  | * | 12/1988 | Shapiro ................... 194/243 |
| 4,974,168 | A  | * | 11/1990 | Marx ....................... 702/187 |
| 5,286,037 | A  | * | 2/1994  | Ghaly ........................ 463/9 |
| 5,437,044 | A  | * | 7/1995  | Hohner et al. .............. 710/72 |
| 5,709,571 | A  | * | 1/1998  | Briski et al. ............ 439/699.2 |
| 5,783,993 | A  | * | 7/1998  | Briski et al. .............. 340/525 |
| 5,836,819 | A  | * | 11/1998 | Ugawa ...................... 463/30 |
| 5,852,432 | A  | * | 12/1998 | Kim ......................... 345/156 |
| 6,001,015 | A  | * | 12/1999 | Nishiumi et al. ............ 463/38 |
| 6,071,194 | A  | * | 6/2000  | Sanderson et al. .......... 463/37 |
| 6,362,813 | B1 | * | 3/2002  | Worn et al. ................ 345/169 |
| 6,563,480 | B1 | * | 5/2003  | Nakamura .................. 345/82 |
| 6,599,141 | B2 | * | 7/2003  | Hambley et al. ........... 439/139 |

* cited by examiner

*Primary Examiner* — Ramesh Patel
(74) *Attorney, Agent, or Firm* — Boswell IP Law; J. Mason Boswell

(57) ABSTRACT

A programmable graphical display switch is described herein that provides users with a way of controlling other devices and for customizing how that control is initiated and communicated to a user.

10 Claims, 1 Drawing Sheet

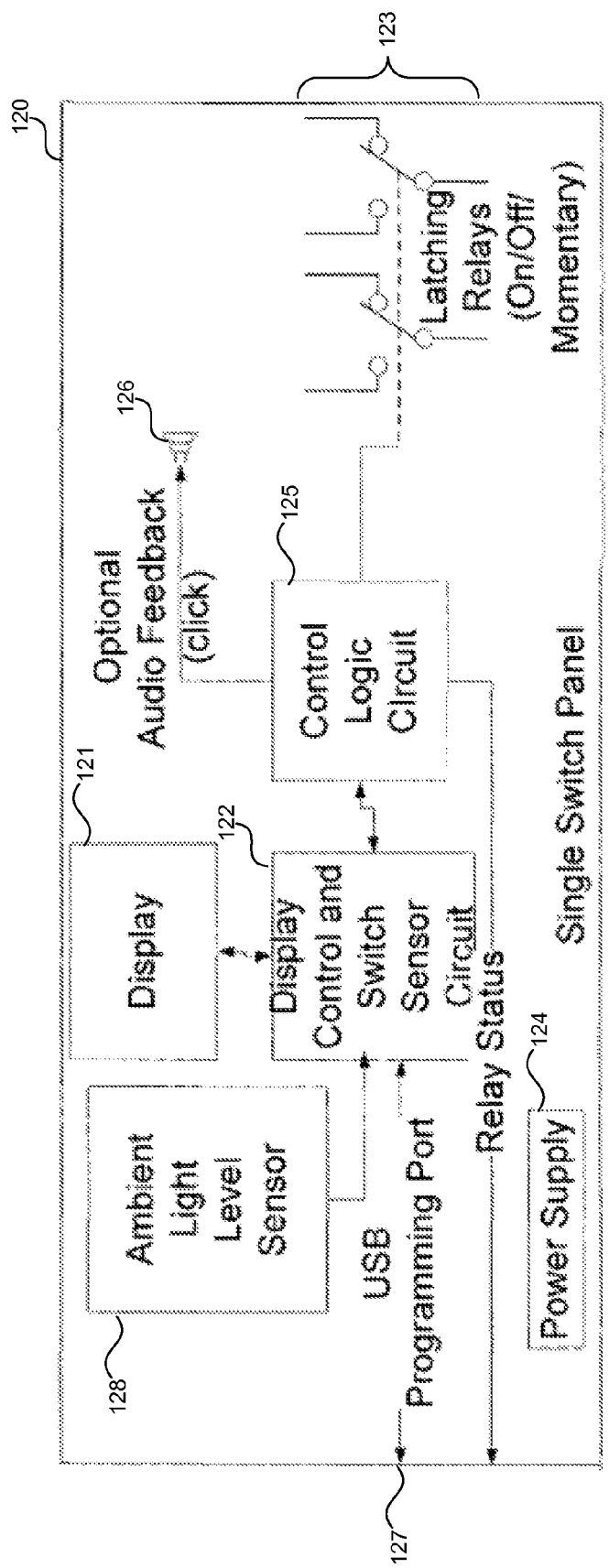

PROGRAMMABLE DISPLAY SWITCH

CROSS-REFERENCE TO RELATED APPLICATIONS

The present application claims the benefit of U.S. Provisional Patent Application No. 60/851,231 entitled "Cabin Management and Entertainment System (CMS)," and filed on Oct. 12, 2006, which is hereby incorporated by reference.

BACKGROUND OF THE INVENTION

1. Field of the Invention

This invention relates to an apparatus for controlling and managing the control of devices and communicating the function or device being controlled to the user.

2. Description of Related/Prior Art

In existing switch technologies the function of the switch is often predetermined and an associated label affixed to the switch that represents its function.

For example, in an aircraft environment, this would amount to hundreds of different part numbers being created, maintained, spared and then certified by the Federal Aviation Administration as safe.

There remains, therefore, a need for a programmable switch that is capable of duplicating the functionality of many other switches, while providing sufficient flexibility to convey its purpose to the user.

OBJECTS AND ADVANTAGES

Accordingly, several objects and advantages of our invention are:

Our programmable display switch (PDS) provides a minimum of one user programmable relay that allows for controlling other devices. The programmable features include but are not limited to: latched or momentary operation. If momentary then the duration is also programmable.

Our PDS includes a user programmable visual display element such as an Organic Light Emitting Diode (OLED) display panel. This display panel is user programmed with different graphics that represent the state of the associated relay.

Our PDS allows for graphics displayed on the visual display panel to be changed by the user even after the PDS has been installed into the target application.

Further objects and advantages of our invention will become apparent from a consideration of the drawings and ensuing description.

BRIEF SUMMARY OF INVENTION

The invention, a programmable display switch, provides users with a way of controlling other devices and for customizing how that control is initiated.

A display panel is connected to a display controller where the user downloads the desired switch state images. When the user wants to change the state of the switch they touch the PDS and switch sensor will detect the touch and change the state of the switch as per the user programming.

For example, if the PDS is being used as a heater control, the ON image may be one of a heater with radiating lines coming from it while the OFF image is one with no lines.

If the heater is currently off, the image could be the current OFF state, in which case when the user touched the PDS the image would change to ON and the relay(s) would either open or close or be latched or momentarily change state depending upon the user program and the requirement of the device being controlled. If at some later date the user no longer liked the heater image with lines they could simply load a new image into the PDS without removing it from its currently installed position.

DRAWINGS

List of Figures

FIG. 1 Programmable Display Switch Block Diagram

DRAWINGS

List of Reference Numbers

The first 1 digits=the figure number and the second 2 digits indicate the part number

| Item | Nomenclature |
| --- | --- |
| 120 | Single Switch Panel |
| 121 | Display |
| 122 | Display Control and Switch Sensor Circuit |
| 123 | Relay(s) |
| 124 | Power Supply |
| 125 | Control Logic Circuit |
| 126 | Audio Feedback |
| 127 | Programming Port |

DETAILED DESCRIPTION

FIG. 1 illustrates the block diagram of the Programmable Display Switch.

A chassis 120 houses a power supply 124, a Display 121, a Display Control and Switch Sensor circuit 122, a control logic circuit 125, one or more relays 123, a programming port 127 and optionally an ambient light sensor 125 and also optionally an audio feedback circuit 126.

OPERATION OF INVENTION

The user loads images into a Display Control and Switch Sensor 122 via a programming port 127. The Display Control and Switch Sensor stores the on state and off state images within its memory. While not being touched the Display 121 will show an image that represents its state. Once touched, the Display Control and Switch Sensor will detect the touch and cause the image on the Display 121 to change to its opposite state. Further, the Switch Sensor 122 will command the Control Logic Circuit 125 to change the state of the relay(s) 123 as per the user programming. Power supply 124 provides power to the internal components of the PDS. Ambient light sensor 128 is optional and can adjust the image according to current lighting conditions. Audio Feedback circuit 126 is also optional and can provide the user with audio feedback when the switch is activated.

User programming of the control logic circuit 127 to control the relay(s) 123 can be either latched ON, latched OFF or momentary. If momentary then this can further be programmed as to the specific duration.

What is claimed is:

1. A programmable display switch apparatus, comprising:
a power supply that provides power to the programmable display switch;

a programming port that allows customizing one or more applications to which the programmable display switch is applied;

one or more latching relays for controlling an attached circuit, a control logic circuit that changes a relay state of the one or more latching relays based on a programmed application of the programmable display switch;

a display control and switch sensor circuit that stores a customized on state image and a customized off state image related to the programmed application of the programmable display switch and that commands the control logic circuit to change the relay state of the relays based on user input;

a programmable display that:
  1) is programmable to display either the on state image or the off state image based on a current state of the programmable display switch,
  2) while not being touched, displays one of the images that represents the current state of the programmable display switch, and
  3) once touched, detects the touch and causes the displayed one of the images to change to another of the images associated with an opposite state, whereby the programmable display switch can be applied in a variety of installations with images shown on the programmable display and operation of the relays customized for the specific application of the programmable display switch.

2. The programmable display switch apparatus of claim 1 further comprising an ambient light level sensor operable to adjust the display based on one or more current lighting conditions.

3. The programmable display switch apparatus of claim 1 further comprising an audio feedback circuit that provides an audible sound based on user interaction with the programmable display switch.

4. The programmable display switch apparatus of claim 1 wherein the programming port receives from a user one or more images associated with the programmable display switch and wherein the display, upon a change of state of the switch, displays at least one of the received images.

5. The programmable display switch apparatus of claim 1 wherein the programming port receives from a user relay state information specifying one or more relay states and wherein the control logic circuit, upon a change of state of the switch, applies at least one of the received relay states to the relays.

6. The programmable display switch apparatus of claim 1 wherein the latching relays can be latched on, latched off, or set to momentary completion of the attached circuit.

7. The programmable display switch apparatus of claim 6 wherein when the latching relays are set to momentary completion of the attached circuit, the switch can be programmed as to a specific duration for the completion during which the relay is on and after which the relay is off.

8. The programmable display switch apparatus of claim 1 wherein an application of the switch can be changed with the apparatus already installed in a particular installation.

9. The programmable display switch apparatus of claim 1 wherein the on image and off image of the switch can be changed with the apparatus already installed in a particular installation.

10. The programmable display switch apparatus of claim 1 wherein the apparatus is installed in an aircraft environment such that a single Federal Aviation Administration (FAA) certified part number can be used for a variety of purposes.

\* \* \* \* \*